United States Patent
Moriyama et al.

(10) Patent No.: US 12,166,352 B2
(45) Date of Patent: Dec. 10, 2024

(54) POWER MANAGEMENT SYSTEM AND POWER MANAGEMENT METHOD

(71) Applicant: KYOCERA CORPORATION, Kyoto (JP)

(72) Inventors: Yuichi Moriyama, Kyoto (JP); Shinji Aikawa, Kyoto (JP); Tetsuya Takenaka, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 350 days.

(21) Appl. No.: 17/763,203

(22) PCT Filed: Sep. 17, 2020

(86) PCT No.: PCT/JP2020/035270
§ 371 (c)(1),
(2) Date: Mar. 24, 2022

(87) PCT Pub. No.: WO2021/060142
PCT Pub. Date: Apr. 1, 2021

(65) Prior Publication Data
US 2022/0344939 A1      Oct. 27, 2022

(30) Foreign Application Priority Data
Sep. 26, 2019   (JP) .................. 2019-175606

(51) Int. Cl.
*H02J 3/14*   (2006.01)
*H02J 3/00*   (2006.01)

(52) U.S. Cl.
CPC .............. *H02J 3/144* (2020.01); *H02J 3/003* (2020.01); *H02J 2300/20* (2020.01)

(58) Field of Classification Search
CPC .... H02J 3/003; H02J 3/46; H02J 3/466; H02J 3/12; H02J 3/14; H02J 3/144; H02J 2300/20
See application file for complete search history.

(56) References Cited

U.S. PATENT DOCUMENTS

| | | | |
|---|---|---|---|
| 7,315,769 B2 * | 1/2008 | Balan ..................... | H02J 3/381 700/286 |
| 7,962,769 B1 * | 6/2011 | Patel ........................ | G06F 1/26 713/300 |

(Continued)

*Primary Examiner* — Nicholas Klicos
(74) *Attorney, Agent, or Firm* — HAUPTMAN HAM, LLP

(57) ABSTRACT

A power management system includes a first receiver for receiving information specifying reverse power flow from a base power meter measuring at least the reverse power flow output from a facility to a power grid, a second receiver for receiving information specifying each of individual output powers of two or more adjustment power supplies provided in the facility, and a controller for specifying each of individual reverse power flows of the two or more adjustment power supplies managed as the reverse power flow. The controller specifies individual reverse power flows of the two or more adjustment power supplies, by executing a correction process of correcting a discrepancy between a sum of the individual output powers of the two or more adjustment power supplies and the reverse power flow based on the individual output powers of the two or more adjustment power supplies.

8 Claims, 7 Drawing Sheets

(56) References Cited

U.S. PATENT DOCUMENTS

| | | | |
|---|---|---|---|
| 2009/0319090 A1* | 12/2009 | Dillon | G06Q 50/06 700/291 |
| 2011/0137482 A1* | 6/2011 | Toba | H02J 3/004 700/291 |
| 2012/0109392 A1* | 5/2012 | Hanks | H02J 3/008 700/291 |
| 2013/0270911 A1* | 10/2013 | Baba | H02J 7/34 307/65 |
| 2014/0163762 A1 | 6/2014 | Nakamura | |
| 2014/0200723 A1* | 7/2014 | Roy | H02J 3/46 700/291 |
| 2014/0214219 A1* | 7/2014 | Katayama | H02J 3/28 700/291 |
| 2014/0249688 A1* | 9/2014 | Ansari | H02J 3/381 700/297 |
| 2016/0344212 A1* | 11/2016 | Murano | H02J 3/50 |
| 2018/0233911 A1* | 8/2018 | Rosendahl | H02J 3/388 |

* cited by examiner

POWER MANAGEMENT SYSTEM AND POWER MANAGEMENT METHOD

RELATED APPLICATIONS

The present application is a National Phase of International Application Number PCT/JP2020/035270 filed Sep. 17, 2020 and claims priority to Japanese Application Numbers 2019-175606 filed Sep. 26, 2019.

TECHNICAL FIELD

The present disclosure relates to a power management system and a power management method.

BACKGROUND ART

Conventionally, a system including a solar cell apparatus, a fuel cell apparatus, a control unit, and a power management apparatus has been disclosed. The control unit transmits information indicating an amount of power to be sold and an amount of power to be purchased to the power management apparatus. Further, the control unit transmits the amount of power to be sold and derived from a solar cell and the amount of power to be sold and derived from a fuel cell to the power management apparatus.

In recent years, a Virtual Power Plant (VPP) has been focused in which an adjustment power supply (for example, the solar cell apparatus, a power storage apparatus, and the fuel cell apparatus) provided in a facility is used for stabilization of a power grid. A reverse power flow output from the facility to the power grid is measured by a base power meter represented by a smart meter.

In such a case, an output power of each adjustment power supply contributing to the reverse power flow needs to be specified, but there are various problems in terms of the following aspects.

First, assuming a case where the output power of each adjustment power supply is measured by a PCS included in each adjustment power supply, a sum of the output power of each adjustment power supply does not match the reverse power flow when a load device is provided in the facility.

Second, assuming a case where an individual sensor is provided for measuring the output power of the adjustment power supply contributing to the reverse power flow, between the adjustment power supply and the base power meter, the individual sensor needs to be disposed closer to the base power meter side than a connection point between the adjustment power supply and an intra-facility wiring. Since the intra-facility wiring generally passes through the inside of a wall, it is difficult to dispose the individual sensor at such a position.

Third, even assuming any case described above, an entity measuring the output power of each adjustment power supply is different from an entity measuring the reverse power flow, and thus the sum of the output power of each adjustment power supply does not match the reverse power flow due to a performance difference between these entities.

CITATION LIST

Patent Literature

Patent Document 1: JP 2011-101532 A

SUMMARY

A power management system according to a first aspect includes a first receiver for receiving information specifying a reverse power flow from a base power meter measuring at least the reverse power flow output from a facility to a power grid, a second receiver for receiving information specifying each of individual output powers of two or more adjustment power supplies provided in the facility, and a controller for specifying each of individual reverse power flows of the two or more adjustment power supplies, managed as the reverse power flow. The controller specifies the individual reverse power flows of the two or more adjustment power supplies, by executing a correction process of correcting a discrepancy between a sum of the individual output powers of the two or more adjustment power supplies and the reverse power flow based on the individual output powers of the two or more adjustment power supplies.

A power management method according to a second aspect includes receiving information specifying a reverse power flow from a base power meter configured to measure at least the reverse power flow output from a facility to a power grid, receiving information specifying each of individual output powers of two or more adjustment power supplies provided in the facility, executing a correction process for correcting a discrepancy between a sum of the individual output powers of the two or more adjustment power supplies and the reverse power flow based on the individual output powers of the two or more adjustment power supplies, and specifying the individual reverse power flows of the two or more adjustment power supplies, managed as the reverse power flow, by the executing the correction process.

DESCRIPTION OF EMBODIMENTS

Embodiments will be described below with reference to the drawings. Note that in the following description of the drawings, the same or similar components will be denoted by the same or similar reference signs. However, the drawings are schematic.

Embodiment

Power Management System

A power management system according to an embodiment will be described below.

Figure 1:
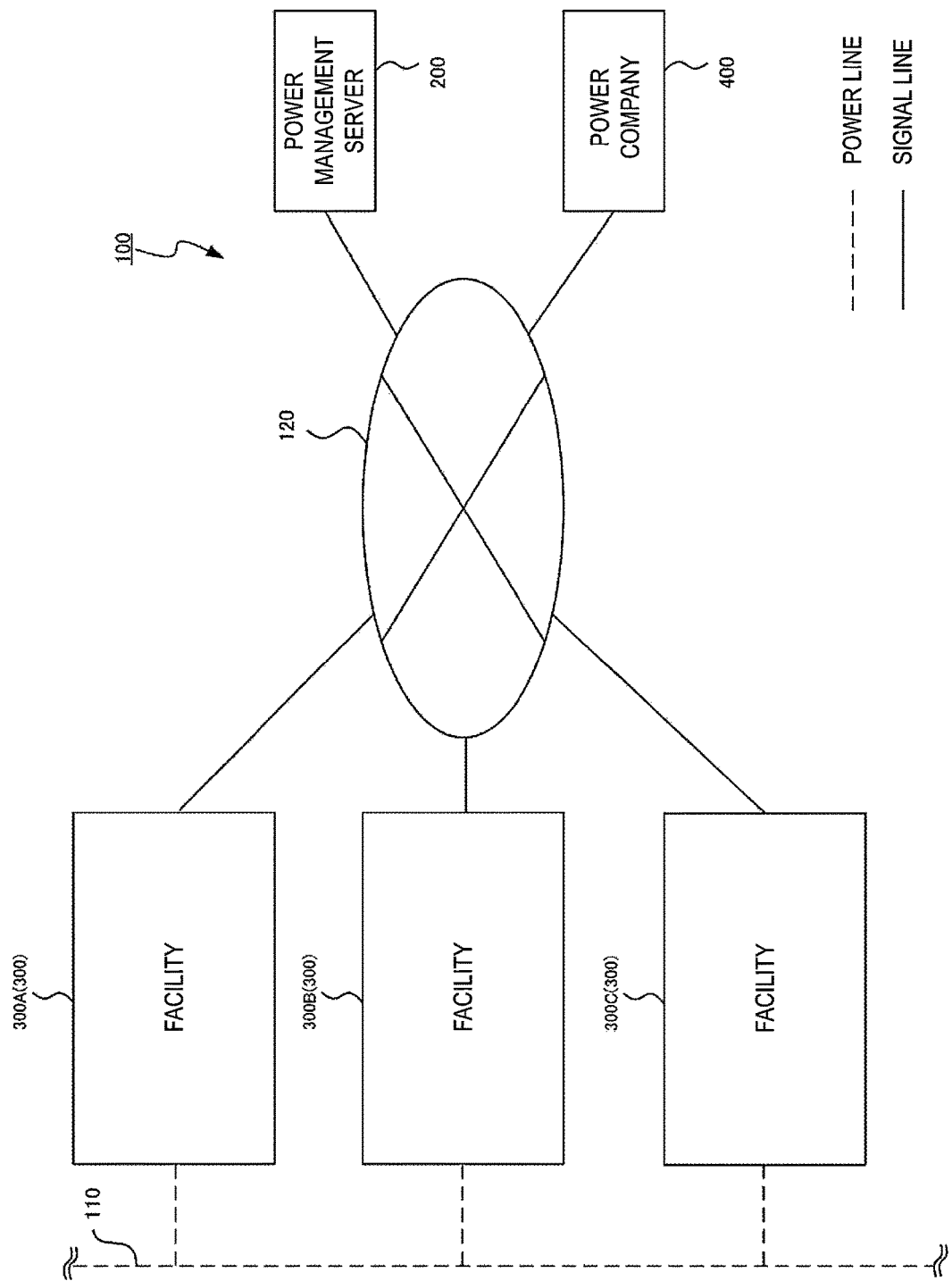
FIG. 1 is a diagram illustrating a power management system 100 according to an embodiment.

As illustrated in FIG. 1, a power management system 100 includes a power management server 200, a facility 300, and a power company 400. In FIG. 1, facilities 300A to 300C are illustrated as examples of the facility 300.

Each facility 300 is connected to a power grid 110. In the following description, the flow of power from the power grid 110 to the facility 300 is referred to as a power flow, and the flow of power from the facility 300 to the power grid 110 is referred to as a reverse power flow.

The power management server 200, the facility 300, and the power company 400 are connected to a network 120. The network 120 may provide lines between these entities. For example, the network 120 is the Internet. The network 120 may include a dedicated line such as a virtual private network (VPN).

The power management server 200 is a sever managed by a business operator, such as a power generation operator, a power transmission and distribution operator, a retailer, or a resource aggregator. The resource aggregator is an electric power provider that provides the reverse power flow to the power generation operator, the power transmission/distribution operator, the retailer, or the like in a virtual power plant (VPP). In the present embodiment, the business operator managing the power management server 200 is an example of an entity that purchases the reverse power flow.

The power management server 200 transmits, to the local controller 360 provided in the facility 300, a control message instructing control of a distributed power supply (for example, a solar cell apparatus 310, a power storage apparatus 320, or a fuel cell apparatus 330) provided in the facility 300. For example, the power management server 200 may transmit a power flow control message (for example, demand response (DR)) requesting control of the power flow and may transmit a reverse power flow control message requesting control of the reverse power flow. Further, the power management server 200 may transmit a power control message for controlling an operating state of the distributed power supply. The degree of control of the power flow or the reverse power flow may be expressed by an absolute value (for example, XX kW), or may be expressed by a relative value (for example, XX %). Alternatively, the degree of control of the power flow or the reverse power flow may be expressed in two or more levels. The degree of control of the power flow or the reverse power flow may be represented by a power charge (RTP: real time pricing) determined by the current power supply and demand balance, and may be represented by a power charge (TOU: time of use) determined by the past power supply and demand balance.

Figure 2:
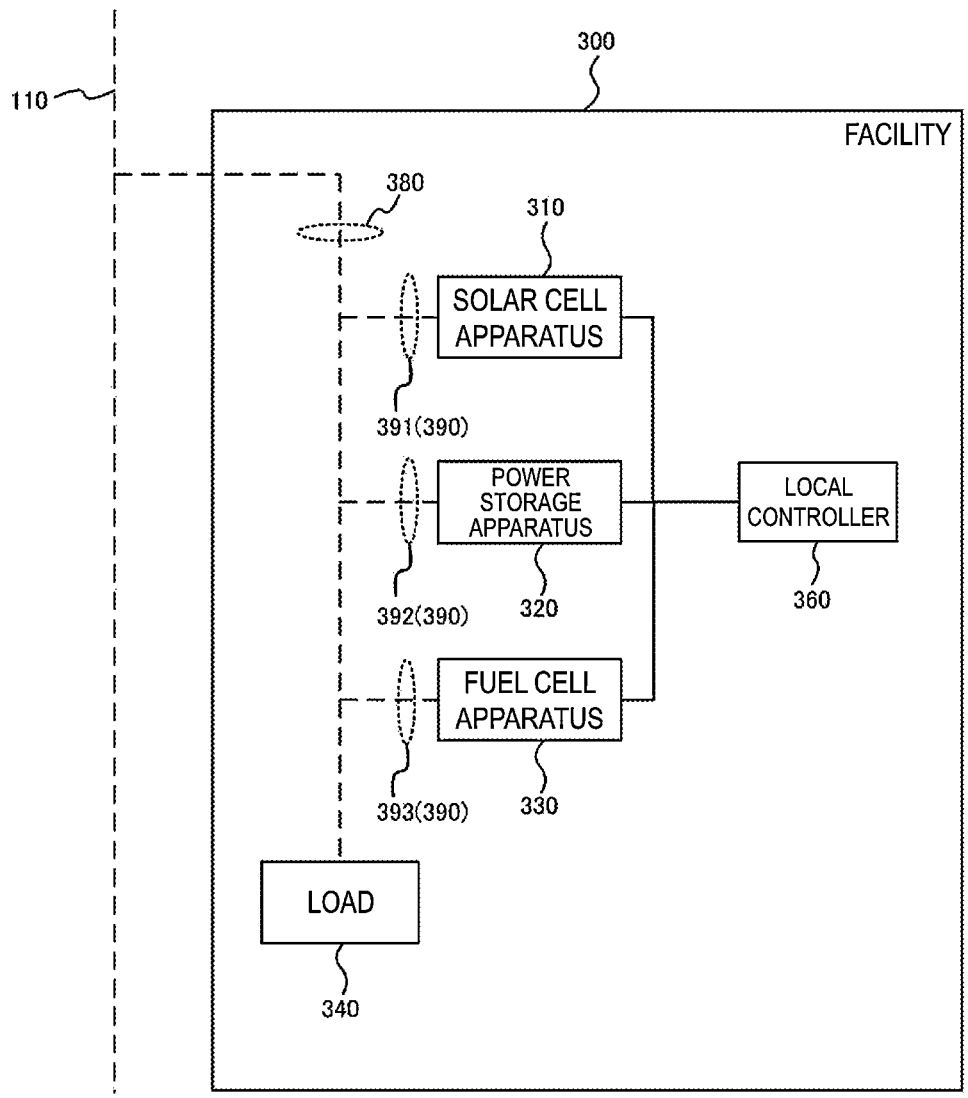
FIG. 2 is a diagram illustrating a facility 300 according to the embodiment.

The facility 300 includes the solar cell apparatus 310, the power storage apparatus 320, the fuel cell apparatus 330, the load device 340, the local controller 360, a power meter 380, and power meters 390, as illustrated in FIG. 2.

The solar cell apparatus 310 is the distributed power supply that generates power in response to sunlight or other light. The solar cell apparatus 310 may be an example of the distributed power supply to which the feed-in tariff (FIT) is applied. For example, the solar cell apparatus 310 includes a power conditioning system (PCS) and a solar panel.

Here, the power output from the solar cell apparatus 310 may vary depending on the amount of received light such as sunlight. Thus, when considering power generation efficiency of the solar cell apparatus 310, the power output from the solar cell apparatus 310 is variable power that is variable according to the amount of received light of the solar panel.

The power storage apparatus 320 is the distributed power supply that charges the power and discharges the power. The power storage apparatus 320 may be an example of the distributed power supply to which the feed-in tariff is not applied. For example, the power storage apparatus 320 includes the PCS and a power storage cell.

The fuel cell apparatus 330 is the distributed power supply that generates power using a fuel. The fuel cell apparatus 330 may be an example of the distributed power supply to which the feed-in tariff is not applied. For example, the fuel cell apparatus 330 includes the PCS and the fuel cell.

For example, the fuel cell apparatus 330 may be a solid oxide fuel cell (SOFC), a polymer electrolyte fuel cell (PEFC), a phosphoric acid fuel cell (PAFC), and a molten carbonate fuel cell (MCFC).

In the embodiment, the solar cell apparatus 310, the power storage apparatus 320, and the fuel cell apparatus 330 may be adjustment power supplies used for the VPP. The adjustment power supply is a power supply that contributes to the VPP among the distributed power supplies provided in the facility 300.

The load device 340 is a device that consumes power. For example, the load device 304 is an air conditioning device, an illumination device, an audio visual (AV) device, or the like.

The local controller 360 is an apparatus (EMS: Energy Management System) that manages power of the facility 300. The local controller 360 may control an operating state of the solar cell apparatus 310, may control an operating state of the power storage apparatus 320 provided in the facility 300, and may control an operating state of the fuel cell apparatus 330 provided in the facility 300. The details of the local controller 360 will be described later (see FIG. 4).

In the embodiment, communication between the power management server 200 and the local controller 360 is performed in accordance with a first protocol. On the other hand, communication between the local controller 360 and the distributed power supply (the solar cell apparatus 310, the power storage apparatus 320, or the fuel cell apparatus 330) is performed in accordance with a second protocol different from the first protocol. For example, as the first protocol, a protocol based on open automated demand response (ADR) or a unique dedicated protocol can be used. For example, as the second protocol, a protocol compliant with ECHONET Lite, smart energy profile (SEP) 2.0, KNX, or a unique dedicated protocol can be used. Note that the first protocol and the second protocol may be different from each other, and, for example, even if both are the unique dedicated protocols, the first protocol and the second protocol may be protocols made of different rules. However, the first protocol and the second protocol may be protocols made of the same rule.

The power meter 380 is an example of a base power meter that measures the power flow from the power grid 110 to the facility 300 and the reverse power flow from the facility 300 to the power grid 110. For example, the power meter 380 is a smart meter that belongs to the power company 400.

Here, the power meter 380 transmits, for each predetermined period (for example, 30 minutes), a message including an information element indicating an integrated value of the power flow or the reverse power flow in the predetermined period to the local controller 360. The power meter 380 may autonomously transmit the message and may transmit the message in response to a request of the local controller 360. The power meter 380 may transmit, for each predetermined period, the message including the information element indicating the power flow or the reverse power flow in the predetermined period to the power management server 200.

The power meter 390 is an example of the individual power meter that measures individual output power of the adjustment power supply. The power meter 390 may be provided at an output end of the PCS of the adjustment power supply, and may be considered to be part of the adjustment power supply. In FIG. 2, a power meter 391, a power meter 392, and a power meter 393 are provided as each of the power meters 390. The power meter 391 measures the individual output power of the solar cell apparatus 310. The power meter 392 measures the individual output power of the power storage apparatus 320. The power meter 393 measures the individual output power of the fuel cell apparatus 330.

Here, the power meter 390 transmits the message including information element indicating the individual output power of the adjustment power supply at an interval (for example, 1 minute) shorter than the predetermined period to the local controller 360. The individual output power of the adjustment power supply may be represented by an instantaneous value and may be represented by an integrated value. The power meters 390 may autonomously transmit the message and may transmit the message in response to a request of the local controller 360.

Returning to FIG. 1, the power company 400 is an entity that provides infrastructure such as the power grid 110, and is, for example, the power generation operator or the power transmission/distribution operator. The power company 400 may entrust various operations to an entity managing the power management server 200.

Power Management Server

Figure 3:
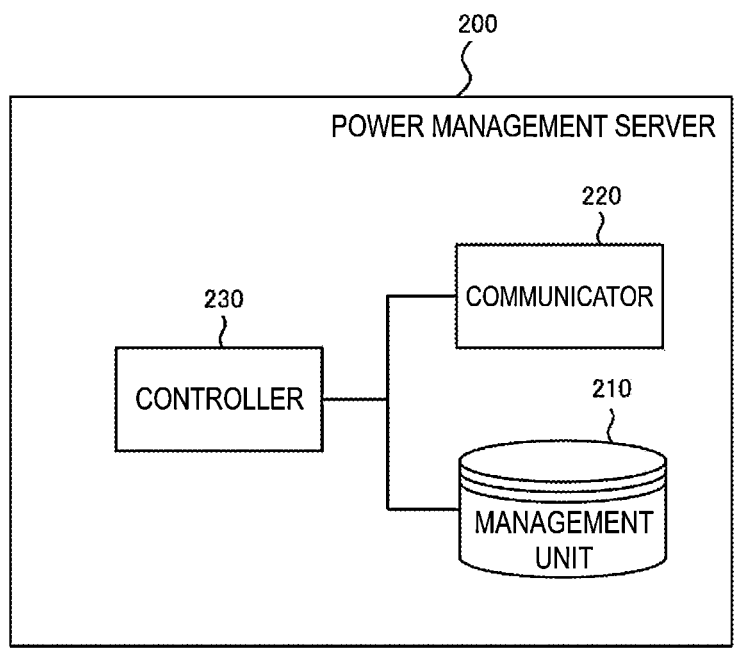
FIG. 3 is a diagram illustrating a power management server 200 according to the embodiment.

A power management server according to an embodiment will be described below. As illustrated in FIG. 3, the power management server 200 includes a management unit 210, a communicator 220, and a controller 230. The power management server 200 is an example of a virtual top node (VTN).

The management unit 210 includes a storage medium, such as a non-volatile memory and/or an HDD, and manages information on the facilities 300. For example, information relating to the facility 300 includes a type of the distributed power supply (the solar cell apparatus 310, the power storage apparatus 320, or the fuel cell apparatus 330) provided in the facility 300, specifications of the distributed power supply (the solar cell apparatus 310, the power storage apparatus 320, or the fuel cell apparatus 330) provided in the facility 300, and the like. The specifications may include a rated generated power of the solar cell apparatus 310, a rated power of the power storage apparatus 320, and a rated power of the fuel cell apparatus 330.

The communicator 220 includes a communication module, and communicates with the local controller 360 via the network 120. The communication module may be a wireless communication module compliant with standards such as IEEE 802.11a/b/g/n, ZigBee, Wi-SUN, and LTE, or may be a wired communication module compliant with standards such as IEEE 802.3.

As described above, the communicator 220 performs communication in accordance with the first protocol. For example, the communicator 220 transmits a first message to the local controller 360 in accordance with the first protocol. The communicator 220 receives the first message response from the local controller 360 in accordance with the first protocol.

The controller 230 may include at least one processor. The at least one processor may be configured of a single integrated circuit (IC) or a plurality of circuits (such as integrated circuits and/or discrete circuits) connected so as to be capable of communicating with each other.

The controller 230 controls each configuration provided in the power management server 200. For example, the controller 230 instructs the local controller 360 provided in the facility 300 to control the distributed power supply (the solar cell apparatus 310, the power storage apparatus 320, or the fuel cell apparatus 330) provided in the facility 300, by transmitting a control message. As described above, the control message may be a power flow control message, may be a reverse power flow control message, or may be a power supply control message.

Local Controller

Figure 4:
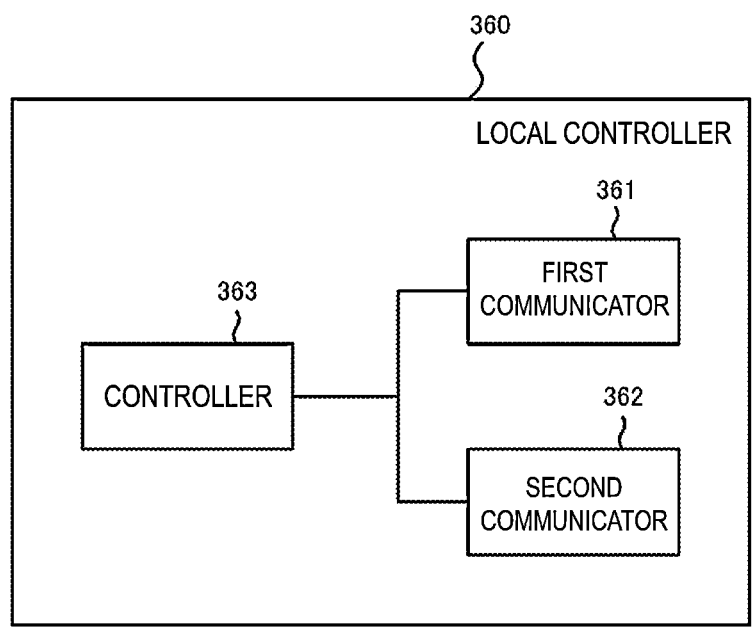
FIG. 4 is a diagram illustrating a local controller 360 according to the embodiment.

A local controller according to an embodiment will be described below. As illustrated in FIG. 4, the local controller 360 includes a first communicator 361, a second communicator 362, and a controller 363. The local controller 360 is an example of a virtual end node (VEN).

The first communicator 361 includes a communication module, and communicates with the power management server 200 via the network 120. The communication module may be a wireless communication module compliant with standards such as IEEE 802.11a/b/g/n, ZigBee, Wi-SUN, and LTE, or may be a wired communication module compliant with standards such as IEEE 802.3.

As described above, the first communicator 361 performs communication in accordance with the first protocol. For example, the first communicator 361 receives the first message from the power management server 200 in accordance with the first protocol. The first communicator 361 transmits the first message response to the power management server 200 in accordance with the first protocol.

The second communicator 362 includes a communication module, and communicates with the distributed power supply (the solar cell apparatus 310, the power storage apparatus 320, or the fuel cell apparatus 330). The communication module may be a wireless communication module compliant with standards such as IEEE 802.11a/b/g/n, ZigBee, Wi-SUN, and LTE, or may be a wired communication module compliant with standards such as IEEE 802.3, the unique dedicated protocols or the like.

As described above, the second communicator 362 performs communication in accordance with the second protocol. For example, the second communicator 362 transmits the second message to the distributed power supply in accordance with the second protocol. The second communicator 362 receives the second message response from the distributed power supply in accordance with the second protocol.

In the embodiment, the second communicator 362 constitutes a first receiver that receives at least information specifying the reverse power flow from the power meter 380. The second communicator 362 may receive information specifying the power flow from the power meter 380. The second communicator 362 constitutes a second receiver that receives information specifying each of the individual output powers of the two or more adjustment power supplies from each of the power meters 390.

The controller 363 may include at least one processor. The at least one processor may be configured of a single integrated circuit (IC) or a plurality of circuits (such as integrated circuits and/or discrete circuits) connected so as to be capable of communicating with each other.

The controller 363 controls each configuration provided in the local controller 360. Specifically, in order to control the power of the facility 300, the controller 363 instructs the device to set an operating state of the distributed power supply by transmitting the second message and receiving the second message response. In order to control the power of the facility 300, the controller 363 may instruct the distributed power supply to report information of the distributed power supply by transmitting the second message and receiving the second message response.

In the embodiment, the controller 363 specifies the individual reverse power flows of the two or more adjustment power supplies, managed as the reverse power flows. The individual reverse power flow means the individual output power of each adjustment power supply that contributes to the reverse power flow. Specifically, the controller 363 specifies the individual reverse power flows of the two or more adjustment power supplies, by executing a correction process for correcting a discrepancy between a sum of the individual output powers of the two or more adjustment power supplies and the reverse power flow based on the individual output powers of the two or more adjustment power supplies.

Individual Reverse Power Flow

Individual reverse power flow according to an embodiment will be described below. Here, a case is exemplified in which the reverse power flow from the facility 300 to the power grid 110 is generated.

Figure 5:
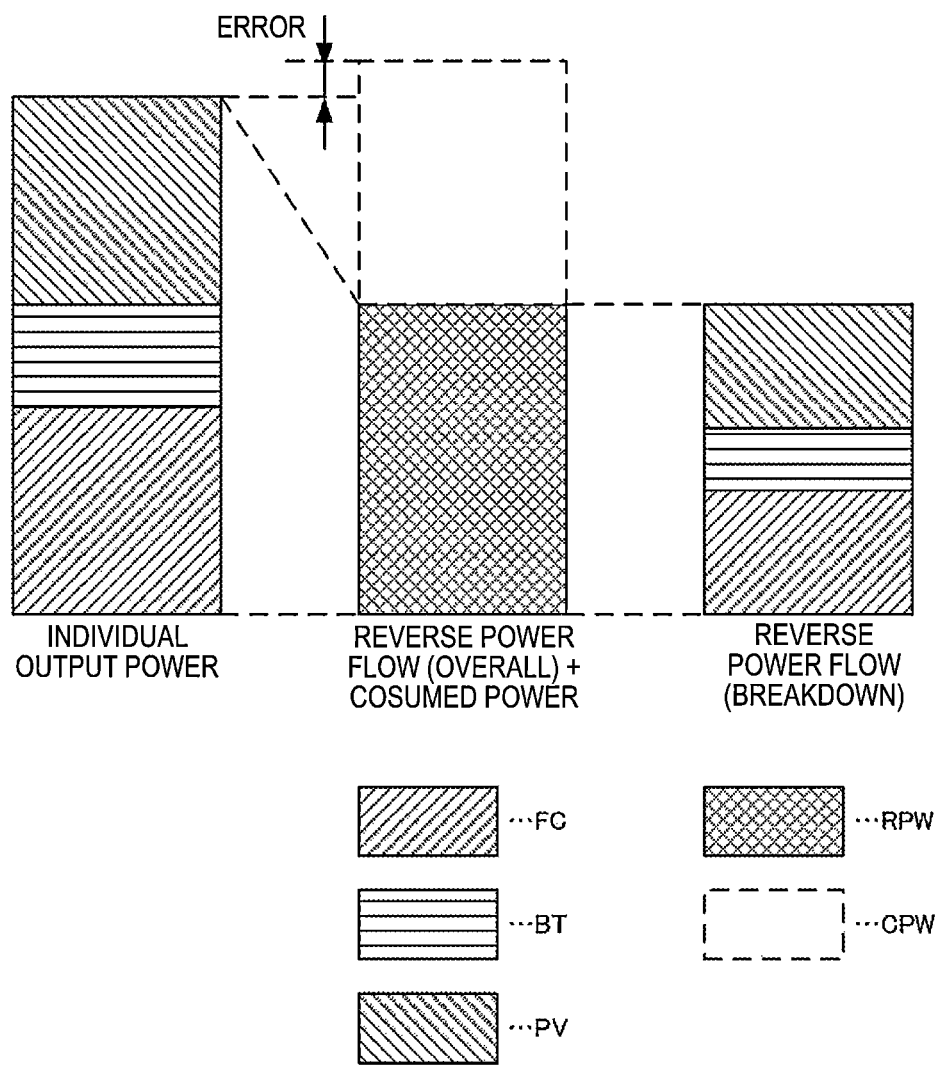
FIG. 5 is a diagram for illustrating an individual reverse power flow according to the embodiment.

As illustrated in FIG. 5, the sum of the individual output powers includes a power (hereinafter, individual output power PV) measured by the power meter 391, a power (hereinafter, individual output power BT) measured by the power meter 392, and a power (hereinafter, individual output power FC) measured by the power meter 393. In such a case, the sum of the individual output powers does not match a power (hereinafter, the reverse power flow RPW) measured by the power meter 380 from the following reason.

First, since the load device 340 is provided in the facility 300, an output power of the adjustment power supply is consumed by the load device 340. Thus, the reverse power flow RPW is a value less than the sum of the individual output powers by the consumed power (hereinafter, consumed power CPW) of the load device 340.

Second, even if the consumed power CPW is measurable, a difference may be present between performance of the individual power meters (power meter 391 to power meter 393) and a performance of the base power meter (power meter 380). In such a case, the sum of the individual output powers does not match the sum of the reverse power flow RPW and the consumed power CPW, and thus an error occurs between the two.

In such an assumption, the controller 363 executes the correction process for correcting the discrepancy between the sum of the individual output powers of the two or more adjustment power supplies and the reverse power flow based on the individual output powers of the two or more adjustment power supplies. In the following, the consumed power CPW may be measured, and the consumed power CPW need not be measured.

(1) Ratio Criteria

The controller 363 may execute the correction process based on a ratio of the individual output powers of the two or more adjustment power supplies. For example, a case will be considered in which a ratio of an individual output power PV is "P/P+Q+R", a ratio of the individual output power BT is "Q/P+Q+R", and a ratio of the individual output power FC is "R/P+Q+R". In such a case, the controller 363 specifies each individual reverse power flow by multiplying the reverse power flow RPW by corresponding one of the ratios. Specifically, the individual reverse power flow (hereinafter, individual reverse power flow PV) of the solar cell apparatus 310 is specified by "reverse power flow RPW"×"P/P+Q+R". Similarly, the individual reverse power flow (hereinafter, individual reverse power flow BT) of the power storage apparatus 320 is specified by "reverse power flow RPW"×"Q/P+Q+R", and the individual reverse power flow (hereinafter, individual reverse power flow FC) of the fuel cell apparatus 330 is specified by "reverse power flow RPW"×"R/P+Q+R".

According to such criteria, each individual reverse power flow is fairly specified according to the ratio of each individual output power.

(2) Feed-In Tariff Criteria

Here, a case will be exemplified in which the two or more adjustment power supplies include a first adjustment power supply (for example, the power storage apparatus 320 or the fuel cell apparatus 330) in which the feed-in tariff of the individual reverse power flow is a first price, and a second adjustment power supply (for example, the solar cell apparatus 310) in which the feed-in tariff of the individual reverse power flow is a second price higher than the first price. In such a case, the controller 363 may execute the correction process such that the individual output power of the first adjustment power supply is proportionally divided as the reverse power flow more preferentially than the individual output power of the second adjustment power supply.

For example, in a case where the sum of the individual reverse power flow BT and the individual reverse power flow FC is greater than the reverse power flow RPW, the sum of the individual reverse power flow BT and the individual reverse power flow FC is not equal to the reverse power flow RPW, and the individual output power PV is zero. In a case where the feed-in tariffs of the individual reverse power flow BT and the individual reverse power flow FC are equal to each other, the individual reverse power flow BT and the individual reverse power flow FC may be specified based on the ratio criteria described above with respect to the difference between the individual output power PV and the reverse power flow RPW. In a case where the feed-in tariffs of the individual reverse power flow BT and the individual reverse power flow supply FC are not equal to each other, the individual output power of the adjustment power supply having a low feed-in tariff may be proportionally divided as the reverse power flow RPW. On the other hand, in a case where the sum of the individual reverse power flow BT and the individual reverse power flow FC is less than the reverse power flow RPW, the individual reverse power flow BT and the individual reverse power flow FC are equal to the individual reverse power flow BT and the individual reverse power flow FC, and the individual output power PV is equal to a difference between the sum of the individual reverse power flow BT and the individual reverse power flow FC and the reverse power flow RPW.

According to such criteria, since the individual output power of the adjustment power supply having the lower feed-in tariff is preferentially proportionally divided as the reverse power flow, the entity purchasing the reverse power flow RPW can avoid suffering an unreasonable loss.

Although not particularly limited, a relationship of the individual output power PV>the individual output power BT>the individual output power FC may be established for the feed-in tariff.

(3) Natural Energy Criteria

Here, a case will be exemplified in which the two or more adjustment power supplies include a first adjustment power supply (for example, the solar cell apparatus 310) that outputs power by utilizing natural energy, and a second adjustment power supply (for example, the power storage apparatus 320 or the fuel cell apparatus 330) that outputs power without utilizing natural energy. In such a case, the controller 363 may execute the correction process such that the individual output power of the first adjustment power supply is proportionally divided as the consumed power CPW of the load device 340 provided in the facility 300 more preferentially than the individual output power of the second adjustment power supply. In other words, the controller 363 may execute the correction process such that the individual output power of the second adjustment power supply is proportionally divided as the reverse power flow more preferentially than the individual output power of the first adjustment power supply.

For example, in a case where the sum of the individual reverse power flow BT and the individual reverse power flow FC is less than the reverse power flow RPW, the individual reverse power flow BT is equal to the individual output power BT, and the individual reverse power flow FC is equal to the individual output power FC. The individual reverse power flow PV is equal to the difference between the reverse power flow RPW and the sum of the individual reverse power flow BT and the individual reverse power flow FC.

On the other hand, in a case where the sum of the individual reverse power flow BT and the individual reverse power flow FC is greater than the reverse power flow RPW, the individual reverse power flow BT and the individual reverse power flow FC may be specified based on the ratio criteria described above with respect to the reverse power flow RPW. In such a case, the individual reverse power flow PV is zero.

According to such criteria, the individual output power output by using natural energy is preferentially utilized as the consumed power CPW in the facility 300, and thus the facility 300 can reduce the discharge amount of $CO_2$.

(4) Communication Connection Criteria

Here, a case will be exemplified in which the two or more adjustment power supplies include a first adjustment power supply in which communication to the second communicator 362 is connected and a second adjustment power supply in which communication to the second communicator 362 is disconnected. In such a case, the controller 363 may execute the correction process such that the individual output power of the first adjustment power supply is proportionally divided as the reverse power flow more preferentially than the individual output power of the second adjustment power supply.

According to such criteria, the individual output power of the adjustment power supply connected to the local controller 360 is preferentially proportionally divided as the reverse power flow RPW, and thus the individual reverse power flow can be appropriately specified based on accurate information.

(5) Environmental Load Criteria

The controller 363 may execute the correction process based on an environmental load associated with the output of the individual output power. In such a case, in a case where the individual output power having a less environmental load is preferentially utilized inside the facility 300, the individual output power having the less environmental load may be preferentially proportionally divided as the consumed power CPW. On the other hand, in a case where the individual output power having the less environmental load is preferentially utilized outside the facility 300, the individual output power having the less environmental load may be preferentially proportionally divided as the reverse power flow RPW.

For example, a case will be considered in which the environmental load associated with the output of the individual output power PV is lowest. In such a case, the individual output power PV may be preferentially utilized inside the facility 300, and the individual output power PV may be preferentially utilized outside the facility 300. In a case where the individual output power PV is preferentially utilized outside the facility 300, similar results to the natural energy criteria described above are obtained.

According to such criteria, by preferentially proportionally dividing the individual output power having the less environmental load as the consumed power CPW, the facility 300 can gain a value (for example, a value of reduction of the $CO_2$ in the green power certificate) by reducing the environmental load. On the other hand, by preferentially proportionally dividing the individual output power having the less environmental load as the reverse power flow RPW, the entity purchasing the reverse power flow RPW can gain a value (for example, the value of reduction of the $CO_2$ in the green power certificate) as a result of reducing the environmental load.

Although not particularly limited, a relationship of the individual output power FC>the individual output power BT>the individual output power PV may be established for the environmental load. In other words, a relationship of the individual output power PV>the individual output power BT>the individual output power FC may be established for the value by reducing the environmental load.

(6) Priority Criteria for Load Device

Here, a case will be exemplified in which a priority for the load device 340 provided in the facility is determined for at least one adjustment power supply of the two or more adjustment power supplies. The controller 363 may execute the correction process based on the priority.

For example, a case will be exemplified in which a high priority is determined for the solar cell apparatus 310 as the priority for the air conditioning device. In other words, the individual output power PV of the solar cell apparatus 310 is preferentially utilized as the consumed power of the air conditioning device. In such a case, a power obtained by subtracting the consumed power of the air conditioning device from the individual output power PV of the solar cell apparatus 310 is handled as the individual output power PV. The consumed power of the air conditioning device is assumed to be measurable.

Similarly, a case will be exemplified in which a high priority is determined for the fuel cell apparatus 330 as the priority for the illumination device. In other words, the individual output power FC of the fuel cell apparatus 330 is preferentially utilized as the consumed power of the illumination device. In such a case, a power obtained by subtracting the consumed power of the illumination device from the individual output power FC of the fuel cell apparatus 330 is handled as the individual output power FC. The consumed power of the illumination device is assumed to be measurable.

In such an assumption, the controller 363 executes the correction process for correcting the discrepancy between the sum of the individual output powers and the reverse power flow RPW based on an amount of power obtained by subtracting the consumed power of the load device 340 from the individual output power. In such a case, the controller 363 may execute the correction process based on the criteria of any one of (1) to (5) described above.

In the example described above, a case is exemplified in which the priority for one load device 340 is determined for one adjustment power supply. However, the embodiment is not limited to this example. The priority for the one load device 340 may be determined for two adjustment power supplies.

Alternately, the priority for the two load devices 340 may be determined for one adjustment power supply.

According to such criteria, an operation is possible in which the consumed power of the predetermined load device 340 is covered by the individual output power of the predetermined adjustment power supply. For example, by covering the consumed power of the air conditioning device with the individual output power of the solar cell apparatus 310, it can be claimed that the environmental load is less due to the operation of the air conditioning device.

(7) Other

The controller 363 may select the criteria used in the correction process from the criteria of (1) to (6) described above, in accordance with the user's preferences. The controller 363 may execute the correction process based on two or more criteria selected from the criteria of (1) to (6) described above. In such a case, a weighted value used in the correction process is defined for two or more criteria, and the correction process may be performed based on the result of weighting the two or more criteria with the weighted value.

Power Management Method

A power management method according to the embodiment will be described below. Here, a case is exemplified in which the reverse power flow from the facility 300 to the power grid 110 is generated.

Figure 6:
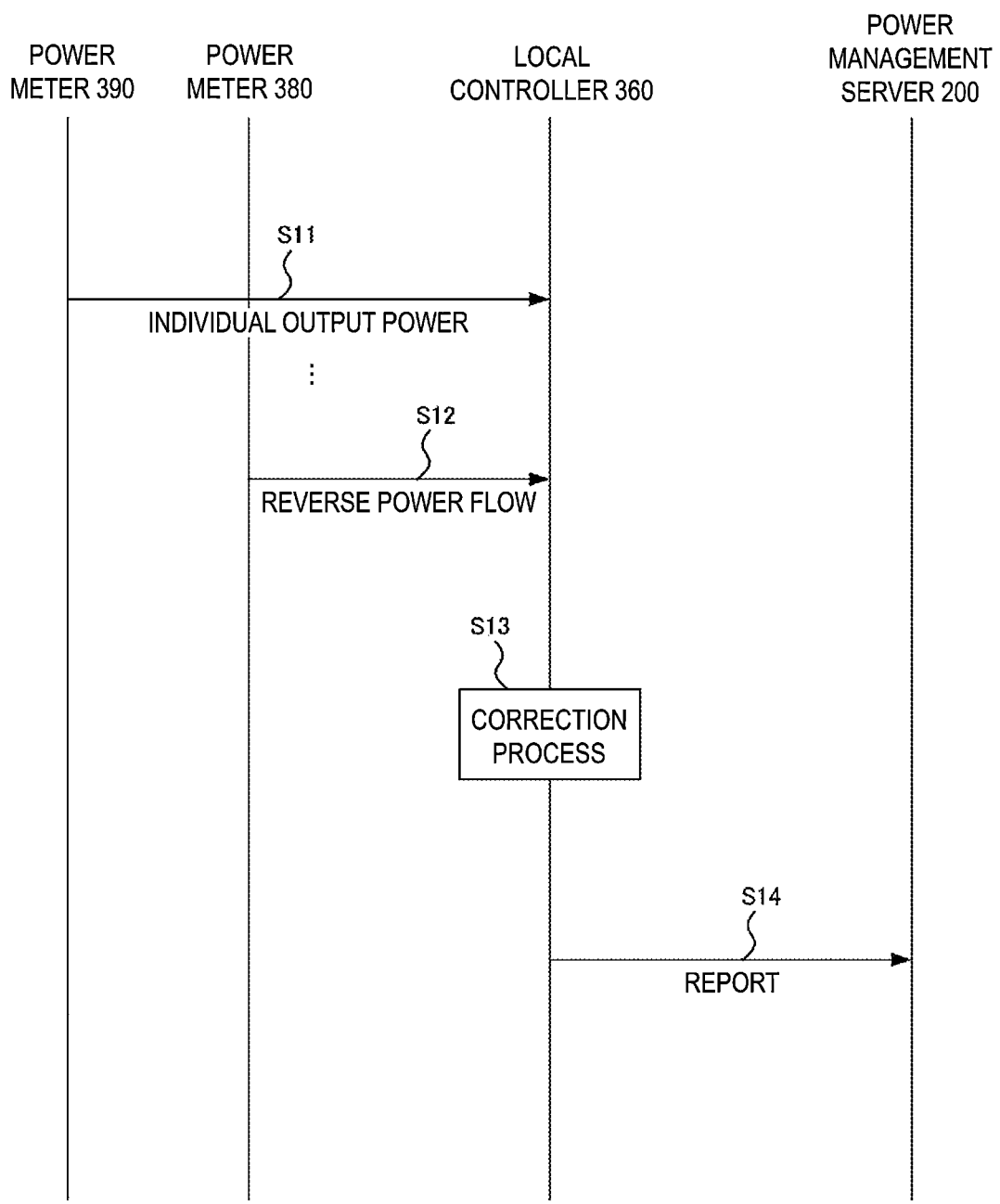
FIG. 6 is a diagram illustrating the power management method according to the embodiment.

As illustrated in FIG. 6, in step S11, the local controller 360 receives, from the power meter 390, a message including an information element indicating the individual output power of each adjustment power supply. The local controller 360 may receive the message at an interval (for example, 1 minute) shorter than the predetermined period.

In step S12, the local controller 360 receives, from the power meter 380, a message including an information element indicating the reverse power flow RPW. The local controller 360 may receive the message for each predetermined period.

In step S13, the local controller 360 executes the correction process for correcting the discrepancy between the sum of the individual output powers of the two or more adjustment power supplies and the reverse power flow based on the individual output powers of the two or more adjustment power supplies.

Further, the local controller 360 specifies the individual reverse power flow by executing the correction process.

In step S14, the local controller 360 transmits a report including an information element indicating the individual reverse power flow of each adjustment power supply to the power management server 200. The local controller 360 may transmit the report for each predetermined period. The information element indicating the individual reverse power flow may be an information element indicating an absolute value of each individual reverse power flow and may be an information element indicating a ratio of each individual reverse power flow.

Actions and Effects

In the embodiment, the local controller 360 specifies the individual reverse power flows of the two or more adjustment power supplies, by executing the correction process for correcting a discrepancy between the sum of the individual output powers of the two or more adjustment power supplies and the reverse power flow based on the individual output powers of the two or more adjustment power supplies. According to such a configuration, even in a case where the load device 340 is provided in the facility 300, or even in a case where a difference is present between the performance of the individual power meters (power meter 391 to power meter 393) and the performance of the base power meter (power meter 380), the individual reverse power flows of the two or more adjustment power supplies can be appropriately specified.

In the embodiment, the local controller 360 executes the correction process based on the criteria of (1) to (7) described above. According to such a configuration, the individual reverse power flow managed as the reverse power flow can be appropriately specified in accordance with the user's preferences or the like.

Modification Example 1

A modification example 1 according to the embodiment will be described below. In the following, differences from the embodiment will be mainly described.

In the embodiment, the case has been described in which the individual power meter 390 measuring the individual output power of each adjustment power supply is provided. In contrast, in the modification example 1, a power meter is provided that measures a sum of the individual reverse power flows of remaining adjustment power supplies excluding one specific adjustment power supply.

Figure 7:
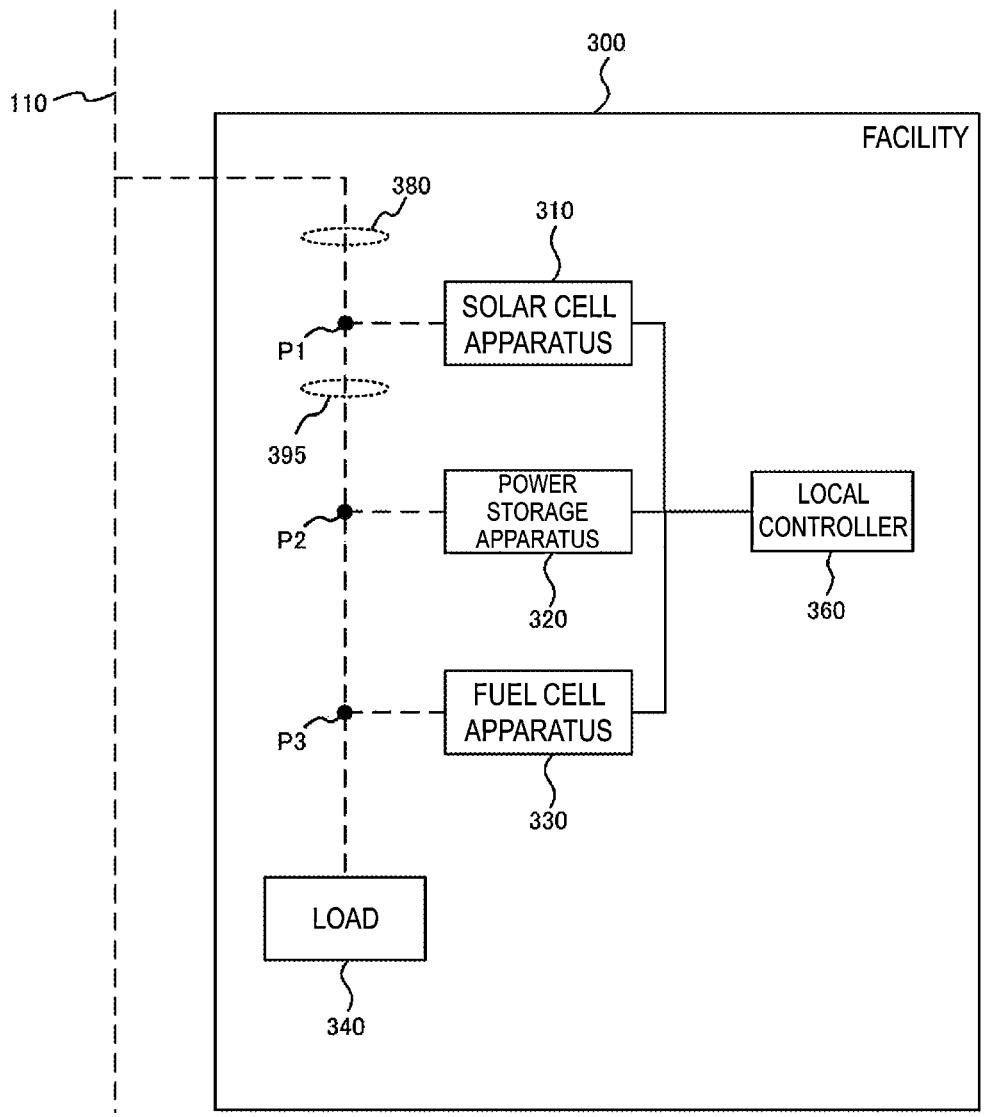
FIG. 7 is a diagram illustrating a facility 300 according to a modification example 1.

In the modification example 1, as illustrated in FIG. 7, a case is exemplified in which the specific adjustment power supply is the solar cell apparatus 310, and the remaining adjustment power supplies are the power storage apparatus 320 and the fuel cell apparatus 330. In such a case, a power meter 395 is provided that measures the sum of the individual reverse power flow BT and the individual reverse power flow FC.

Specifically, in the facility 300, on a main power line connected to the power grid 110, a connection point between the solar cell apparatus 310 and the main power line is P1, a connection point between the power storage apparatus 320 and the main power line is P2, and a connection point between the fuel cell apparatus 330 and the main power line is P3. In such a case, the power meter 395 is provided between P1 and P2 on the main power line. The power meter 395 can measure the power flow and the reverse power flow (in other words, the sum of the individual reverse power flow BT and the individual reverse power flow FC) on the downstream side of the power meter 395. The power meter 395 may be a power meter that has been certified by a third party organization.

In such a case, the individual reverse power flow power FC can be specified using a difference between the reverse power flow measured by the power meter 380 and the power measured by the power meter 395. The individual reverse power flow BT and the individual reverse power flow FC are specified by executing the correction process based on the individual output power BT and the individual output power FC with respect to the power measured by the power meter 395. The correction process is executed based on the criteria of (1) to (7) described above, similar to the embodiment.

Although omitted in FIG. 7, the power meter 390 described above may be provided in the facility 300. The power meter 390 may be provided at the output end of the PCS of the adjustment power supply.

In the modification example 1, the specific adjustment power supply may be an adjustment power supply that utilizes natural energy to output power.

Other Embodiments

Although the present disclosure has been described by the above-described embodiment, it should be understood that the description and the drawings which form a part of this disclosure do not limit this disclosure. Various alternative embodiments, examples, and operational techniques will be apparent from this disclosure to those skilled in the art.

In the embodiments, the case has been exemplified in which the controller specifying the individual reverse power flow is provided in the local controller 360. However, the embodiment is not limited to this example. The controller that specifies the individual reverse power flow may be the controller 230 provided in the power management server 200. In such a case, the first receiver that receives the information specifying the reverse power flow and the second receiver that receives the information specifying the individual output power may be the communicator 220 provided in the power management server 200.

Although not particularly mentioned in the embodiment, the feed-in tariff of each of the individual reverse power flows may be different from each other in accordance with the criteria of (1) to (7) described above.

In the embodiment, the solar cell apparatus 310 has been exemplified as the adjustment power supply that outputs power by utilizing natural energy. However, the embodiment is not limited to this example. The adjustment power supply that outputs power by utilizing natural energy may include one or more adjustment power supplies selected from a wind power generation apparatus, a water power generation apparatus, a geothermal power generation apparatus, and the biomass power generation apparatus.

In the embodiment, the case has been exemplified in which each adjustment power supply includes an individual PCS. However, the embodiment is not limited to this example. One multi-DC link PCS may be provided for the two or more adjustment power supplies.

In an embodiment, the case has been exemplified in which the local controller 360 is provided in the facility 300. However, the embodiment is not limited to this example. The local controller 360 may be provided by a cloud service.

Although not specifically mentioned in the embodiment, the electric power may be an instantaneous value (kW) or an integrated value per unit time (kWh).

The contents of JP No. 2019-175606 (filed on Sep. 26, 2019) are incorporated herein by reference in its entirety.

The invention claimed is:

1. A power management system, comprising:
   a first receiving unit that receives information specifying a reverse power flow from a base power meter that measures at least the reverse power flow output from a facility to a power grid;
   a second receiving unit that receives information specifying each of individual output powers of two or more adjustment power supplies provided in the facility, the two or more adjustment power supplies being distributed power supplies that contribute to a virtual power plant; and
   a control unit that specifies individual reverse power flows of the two or more adjustment power supplies, managed as the reverse power flow, wherein
   the control unit specifies the individual reverse power flows of the two or more adjustment power supplies, by executing a correction process of correcting a discrepancy between a sum of the individual output powers of the two or more adjustment power supplies and the reverse power flow, based on the individual output powers of the two or more adjustment power supplies,
   the control unit executes, as the correction process, at least one of a first correction process, a second correction process, or a third correction process,
   the first correction process is a process to proportionally divide the reverse power flow in a manner that an individual output power of a first adjustment power supply is prioritized more than an individual output power of a second adjustment power supply, when the two or more adjustment power supplies comprise the first adjustment power supply in which a feed-in tariff of the individual reverse power flow is a first price, and the second adjustment power supply in which the feed-in tariff of the individual reverse power flow is a second price greater than the first price,
   the second correction process is a process to proportionally divide the reverse power flow in a manner that the individual output power of the first adjustment power supply is prioritized more than the individual output power of the second adjustment power supply, when the two or more adjustment power supplies comprise the first adjustment power supply outputting a power by utilizing natural energy and the second adjustment power supply outputting a power without utilizing natural energy, and
   the third correction process is a process to proportionally divide the reverse power flow in a manner that the individual output power of the first adjustment power supply is prioritized more than the individual output power of the second adjustment power supply, when the two or more adjustment power supplies comprise the first adjustment power supply in which communication to the second receiving unit is connected and the second adjustment power supply in which communication to the second receiving unit is disconnected.

2. The power management system according to claim 1, wherein
   the control unit executes the correction process based on an environmental load associated with an output of the individual output power.

3. The power management system according to claim 1, wherein
   the control unit executes the correction process based on a ratio of the individual output powers of the two or more adjustment power supplies.

4. The power management system according to claim 1, wherein
   at least one adjustment power supply of the two or more adjustment power supplies has a priority to supply power to a load device provided in the facility, and
   the control unit executes the correction process based on the priority.

5. The power management system according to claim 1, wherein the control unit executes the first correction process.

6. The power management system according to claim 5, wherein the control unit further executes the second correction process.

7. The power management system according to claim 6, wherein the control unit further executes the third correction process.

8. A power management method, comprising:
   receiving, by a first receiving unit, information specifying a reverse power flow from a base power meter that measures at least the reverse power flow output from a facility to a power grid;
   receiving, by a second receiving unit, information specifying each of individual output powers of two or more adjustment power supplies provided in the facility, the two or more adjustment power supplies being distributed power supplies that contribute to a virtual power plant;
   executing a correction process for correcting a discrepancy between a sum of the individual output powers of the two or more adjustment power supplies and the reverse power flow based on the individual output powers of the two or more adjustment power supplies; and specifying the individual reverse power flows of the two or more adjustment power supplies, managed as the reverse power flow, by the executing the correction process, wherein the correction process includes at least one of a first correction process, a second correction process, or a third correction process, the first correction process is a process to proportionally divide the reverse power flow in a manner that an individual output power of a first adjustment power supply is prioritized more than an individual output power of a second adjustment power supply, when the two or more adjustment power supplies comprise the first adjustment power supply in which a feed-in tariff of the individual reverse power flow is a first price, and the second adjustment power supply in which the feed-in tariff of the individual reverse power flow is a second price greater than the first price, the second correction process is a process to proportionally divide the reverse power flow in a manner that the individual output power of the first adjustment power supply is prioritized more than the individual output power of the second adjustment power supply, when the two or more adjustment power supplies comprise the first adjustment power supply outputting a power by utilizing natural energy and the second adjustment power supply outputting a power without utilizing natural energy, and the third correction process is a process to proportionally divide the reverse power flow in a manner that the individual output power of the first adjustment power supply is prioritized more than the individual output power of the second adjustment power supply, when the two or more adjustment power supplies comprise the first adjustment power supply in which communication to the second receiving unit is connected and the second adjustment power supply in which communication to the second receiving unit is disconnected.

* * * * *